United States Patent
Nishio (10) Patent No.: US 7,329,373 B2
(45) Date of Patent: Feb. 12, 2008

(54) CONTROL METHOD OF ROTATIONAL SPEED OF SCREW FOR INJECTION MOLDING MACHINE

(75) Inventor: Okito Nishio, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 215 days.

(21) Appl. No.: 10/766,481

(22) Filed: Jan. 29, 2004

(65) Prior Publication Data

US 2004/0188877 A1    Sep. 30, 2004

Related U.S. Application Data

(62) Division of application No. 10/235,551, filed on Sep. 6, 2002, now Pat. No. 6,755,636.

(30) Foreign Application Priority Data

| Sep. 14, 2001 | (JP) | ............................. 2001-279180 |
| Sep. 14, 2001 | (JP) | ............................. 2001-279181 |
| Oct. 2, 2001  | (JP) | ............................. 2001-306379 |

(51) Int. Cl.
    *B29C 45/77* (2006.01)
(52) U.S. Cl. .................... 264/40.1; 264/328.1; 425/145
(58) Field of Classification Search ............... 264/40.1, 264/328.1; 425/145
    See application file for complete search history.

(56) References Cited

U.S. PATENT DOCUMENTS

| 5,645,868 A | 7/1997 | Reinhart ...................... 425/145 |
| 5,679,384 A | 10/1997 | Emoto ......................... 425/145 |
| 5,823,293 A | 10/1998 | Gilbertson et al. |
| 5,864,192 A * | 1/1999 | Nagate et al. ......... 310/156.05 |
| 5,891,485 A | 4/1999 | Emoto ......................... 425/145 |
| 5,911,924 A | 6/1999 | Siegrist et al. ............. 264/40.1 |
| 6,016,056 A * | 1/2000 | Seki ........................... 324/165 |
| 6,051,896 A | 4/2000 | Shibuya et al. |
| 6,376,940 B1 * | 4/2002 | Shibuya et al. ............. 425/145 |
| 6,394,780 B1 | 5/2002 | Hehl .......................... 425/145 |
| 6,517,336 B1 | 2/2003 | Emoto et al. ............... 425/145 |
| 6,737,861 B2 * | 5/2004 | Lantto ................... 324/207.16 |
| 2002/0050756 A1 * | 5/2002 | Ito ............................. 310/135 |

FOREIGN PATENT DOCUMENTS

| DE | 195 48 756 A1 | 6/1997 |
| DE | 198 52 513 A1 | 6/1999 |
| DE | 299 10 332 U1 | 11/2000 |
| DE | 200 21 187 U1 | 4/2001 |
| EP | 1 004 421 A1 | 5/2000 |

(Continued)

*Primary Examiner*—Jill L. Heitbrink
(74) *Attorney, Agent, or Firm*—Squire Sanders & Dempsey L.L.P.

(57) ABSTRACT

A control method of a rotational speed of a screw for an injection molding machine, wherein rotation of a motor is transmitted the screw disposed within a cylinder member attached to an injection frame, includes the steps of (a) sending an electric current to a stator attached to the injection frame, (b) rotating a rotor which is disposed radially inward of the stator, and which includes a hollow and cylindrical member and a magnet attached to the hollow and cylindrical member, and (c) transmitting rotation of the rotor to the screw.

10 Claims, 5 Drawing Sheets

FOREIGN PATENT DOCUMENTS

| | | |
|---|---|---|
| JP | 5-77295 A | 3/1993 |
| JP | 5-220796 A | 8/1993 |
| JP | 05345337 | 12/1993 |
| JP | 11-291311 | 10/1999 |
| JP | 11320602 | 11/1999 |
| JP | 2000-52393 A | 2/2000 |
| JP | 2000-52394 | 2/2000 |
| JP | 2000-52395 A | 2/2000 |
| JP | 2000-71304 A | 3/2000 |

\* cited by examiner

CONTROL METHOD OF ROTATIONAL SPEED OF SCREW FOR INJECTION MOLDING MACHINE

This is a Division of application Ser. No. 10/235,551 filed Sep. 6, 2002 now U.S. Pat. No. 6,755,636. The disclosure of the prior application(s) is hereby incorporated by reference herein in its entirety.

BACKGROUND OF THE INVENTION

1. Field of the Invention

The present invention relates to a control method of a rotational speed of a screw for an injection molding machine.

2. Description of the Related Art

Conventionally, in an injection molding machine, a screw is disposed within a heating cylinder of an injection apparatus such that it can rotate and can advance and retreat. By operating a drive mechanism, the screw can be rotated, and can be advanced and retreated. In a metering process, the screw is rotated, whereby a resin which is supplied from a hopper into the heating cylinder is melted through application of heat and transferred forward, and the molten resin is stored in a space located ahead of a screw head attached to the front end of the screw. In an injection process, the screw is caused to advance, whereby the molten resin, which is stored in the space located ahead of the screw head, is injected from an injection nozzle into the cavity of a mold apparatus so as to fill the cavity.

Figure 1:
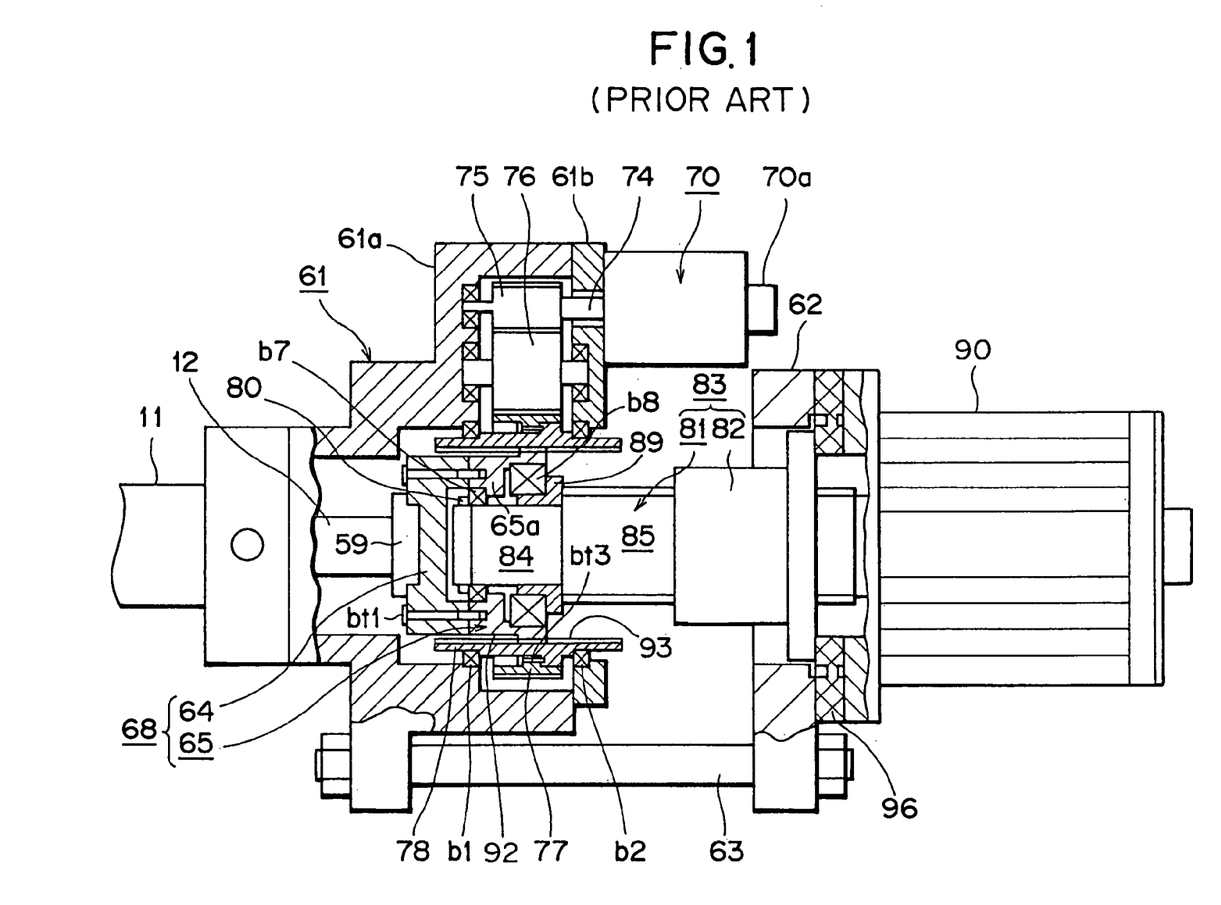
FIG. 1 is a conceptual view of a conventional injection apparatus.

FIG. 1 is a conceptual view of a conventional injection apparatus.

In FIG. 1, reference numeral 11 denotes a heating cylinder. A screw 12 is disposed within the heating cylinder 11 such that it can rotate and can advance and retreat (move leftward and rightward in FIG. 1). An unillustrated injection nozzle is attached to the front end (left-hand end in FIG. 1) of the heating cylinder 11, and a nozzle hole is formed in the injection nozzle.

The rear end (right-hand end in FIG. 1) of the heating cylinder 11 is attached to a front injection support 61, and a rear injection support 62 is disposed a predetermined distance away from the front injection support 61. The front injection support 61 includes a box-like body 61a and a cover 61b. Rods 63 extend between the front injection support 61 and the rear injection support 62, for maintaining a predetermined distance therebetween. The front injection support 61, the rear injection support 62, and the rods 63 constitute an injection frame.

A circular connection member 64 is integrally attached to the rear end of the screw 12 via a coupler 59. A cylindrical support member 65 is attached to the connection member 64 by use of bolts bt1. The connection member 64 and the support member 65 constitute a rotary slide member 68, which unitarily rotates with the screw 12. A male spline 92 is formed on the outer circumferential surface of a rear end of the support member 65.

In order to transmit rotation to the rotary slide member 68, a cylindrical rotary member 78 is disposed while surrounding the rotary slide member 68, and a female spline 93 is formed on the inner circumferential surface of the rotary member 78. The female spline 93 has an axial length equivalent to the stroke of the screw 12. The rotary member 78 is supported by bearings b1 and b2 in such a manner as to be rotatable relative to the front injection support 61.

An electrically operated metering motor 70 is disposed. In a metering process, the metering motor 70 is operated to rotate the rotary slide member 68, whereas, in the injection process, the metering motor 70 generates reverse torque to stop the rotation of the rotary slide member 68. The metering motor 70 includes an unillustrated stator, an unillustrated rotor disposed radially inward of the stator, an output shaft 74, and an encoder 70a attached to the output shaft 74 and adapted to detect the rotational speed of the metering motor 70, and is controlled on the basis of a detection signal output from the encoder 70a. Each of the stator and the rotor includes a core, and a coil wound onto the core.

An output gear 75, a counter drive gear 76, a counter driven gear 77, and the rotary member 78 are disposed between the metering motor 70 and the rotary slide member 68. The output gear 75 is attached to the output shaft 74. The output gear 75 and the counter drive gear 76 are engaged with each other. The counter drive gear 76 and the counter driven gear 77 are engaged with each other. The counter driven gear 77 is attached to the rotary member 78 by use of bolts bt3.

The output gear 75, the counter drive gear 76, the counter driven gear 77, and the rotary member 78 transmit to the rotary slide member 68 rotation generated through operation of the metering motor 70. For such operation, the rotary slide member 68 is disposed in such a manner as to be nonrotatable and axially movable relative to the rotary member 78; and the outer circumferential surface of the connection member 64 and the inner circumferential surface of the rotary member 78 are in slidable contact with each other. That is, the female spline 93 formed on the inner circumferential surface of the rotary member 78 is spline-engaged with the above-described male spline 92 to be slidable relative thereto.

Accordingly, when the output shaft 74 is rotated through operation of the metering motor 70, rotation is transmitted to the rotary slide member 68 via the output gear 75, the counter drive gear 76, the counter driven gear 77, and the rotary member 78, whereby the rotary slide member 68 is rotated in the regular direction or in reverse as needed, and thus the screw 12 is rotated accordingly. When the metering motor 70 is stopped and is caused to restrain the output shaft 74 by force of restraint, the rotary slide member 68 is caused to stop rotating, so that the screw 12 is caused to stop rotating.

A ball screw 83, which includes a ball screw shaft 81 and a ball nut 82 and serves as a direction-of-motion changing section, is disposed rearward (rightward in FIG. 1) of the front injection support 61. The ball screw shaft 81 includes a small-diameter shaft portion 84, a large-diameter threaded portion 85, a connection portion to be connected to an injection motor 90, etc. which are sequentially formed from the front end of the ball screw shaft toward its rear end. An annular flange member 89 is externally fitted to the shoulder between the shaft portion 84 and the threaded portion 85.

The electrically operated injection motor 90 is fixed to the rear injection support 62 via a load cell 96. The injection motor 90 is operated in the injection process. Rotation generated by the injection motor 90 is transmitted to the threaded portion 85. The above-described ball screw 83 converts a rotary motion generated by the injection motor 90 to a rectilinear motion accompanied by rotation; i.e., to a rotary, rectilinear motion, and transmits the rotary, rectilinear motion to the rotary slide member 68.

Thus, the ball screw shaft 81 is supported, at its front end by bearings b7 and b8, in such a manner as to be rotatable and axially immovable relative to the rotary slide member 68, and is rotatably engaged with and supported by the ball nut 82 at its center. That is, the rotary slide member 68 is disposed in such a manner as to be rotatable relative to the ball screw 83 and axially movable relative to the rotary member 78. An unillustrated male screw is formed on a front end part of the shaft portion 84, and a bearing nut 80 is disposed while being engaged with the male screw. The bearing nut 80, together with a protrusion 65a formed on the inner circumferential surface of the support member 65, positions the bearing b7.

The ball nut 82 is fixedly attached to the rear injection support 62 via the load cell 96. The load cell 96 detects an injection force and a dwell pressure.

Accordingly, when rotation generated through operation of the injection motor 90 in the regular or reverse direction is transmitted to the ball screw shaft 81 via the connection portion, the ball screw shaft 81 is caused to advance or retreat while rotating, since the threaded portion 85 and the ball nut 82 are engaged with each other.

In the injection process or a like process, in which the rotary slide member 68 is caused to advance or retreat without rotation, stoppage of the operation of the metering motor 70 causes stoppage of the rotation of the rotary slide member 68, and the subsequent operation of the injection motor 90 causes the rotary slide member 68 to axially move. As a result, a rectilinear motion is transmitted to the screw 12, which is integrally attached to the rotary slide member 68, whereby the screw 12 is caused to advance (move leftward in FIG. 1).

Next, the operation of the thus-configured injection apparatus will be described.

First, in the metering process, when the metering motor 70 is operated, the rotation of the output shaft 74 is transmitted to the screw 12 via a transmission mechanism, which is composed of the output gear 75, the counter drive gear 76, the counter driven gear 77, the rotary member 78, etc., and the rotary slide member 68, to thereby rotate the screw 12 in the regular direction.

This rotation of the screw 12 causes unillustrated resin, which drops from an unillustrated hopper disposed on the heating cylinder 11, to advance along an unillustrated groove formed on the outer circumferential surface of the screw 12, and causes the screw 12 to retreat (move rightward in FIG. 1), whereby the resin is stored in a space located ahead of an unillustrated screw head attached to the front end of the screw 12. At this time, the force of retreat induced on the screw 12 causes the rotary slide member 68 to move relative to the rotary member 78; specifically, to retreat. As the rotary slide member 68 retreats, the ball screw shaft 81 is caused to retreat while rotating.

Next, in the injection process, the injection motor 90 is operated. The resultant rotation of the output shaft 94 is transmitted to the ball screw shaft 81 via the connection portion. The ball screw 83 converts the rotary motion to a rotary, rectilinear motion. As a result, the ball screw shaft 81 is caused to advance while rotating.

Then, when the metering motor 70 causes the rotary slide member 68 to stop rotating, the screw 12 is caused to advance without rotation, since the screw 12 is integrally attached to the rotary slide member 68.

Since the conventional injection apparatus requires the transmission mechanism and the rotary member 78 in order to transmit rotation generated by the metering motor 70 to the rotary slide member 68, noise arises from engagement of gears and other members, and the size thereof increases. Further, a large number of components are employed, resulting in emergence of torque loss and an increase in the cost of the injection apparatus.

Moreover, at the time of assembly, maintenance, etc. of the injection apparatus, the ball screw 83 is built into the injection apparatus along with the support member 65 and the bearings b7 and b8, and such building-in work must be performed in consideration of meshing engagement between the male spline 92 formed on the outer circumferential surface of the support member 65 and the female spline 93 formed on the inner circumferential surface of the rotary member 78. Therefore, when meshing engagement cannot be established properly at the spline portion, the building-in work requires a longer time, which deteriorates easiness of assembly, maintenance, etc.

SUMMARY OF THE INVENTION

An object of the present invention is to solve the above-mentioned problems in the conventional injection apparatus and to provide an injection apparatus capable of preventing generation of noise, enabling reduction in size, reducing the number of components, preventing emergence of torque loss, and reducing cost.

The above objects of the present invention are achieved by a control method of a rotational speed of a screw for an injection molding machine, wherein rotation of a motor is transmitted the screw disposed within a cylinder member attached to an injection frame, including the steps of:

(a) sending an electric current to a stator attached to the injection frame;

(b) rotating a rotor which is disposed radially inward of the stator, and which includes a hollow and cylindrical member and a magnet attached to the hollow and cylindrical member; and (c) transmitting rotation of the rotor to the screw.

The above objects of the present invention are also achieved by a control method of a rotational speed of a screw for an injection molding machine, wherein rotation of a motor is transmitted the screw disposed within a cylinder member attached to an injection frame, comprising the steps of:

(a) sending an electric current to a stator attached to the injection frame;

(b) rotating a rotor which is disposed radially inward of the stator, the screw, and an element to be detected; and (c) detecting a rotational speed of the screw by a detecting element disposed in opposition to the element to be detected and in a manner where the detecting element does not come in contact with the element to be detected.

BRIEF DESCRIPTION OF DRAWINGS

The structure and features of the injection apparatus according to the present invention will be readily appreciated as the same becomes better understood by referring to the drawings, in which.

DESCRIPTION OF PREFERRED EMBODIMENTS

Embodiments of the present invention will next be described in detail with reference to the drawings.

Figure 2:
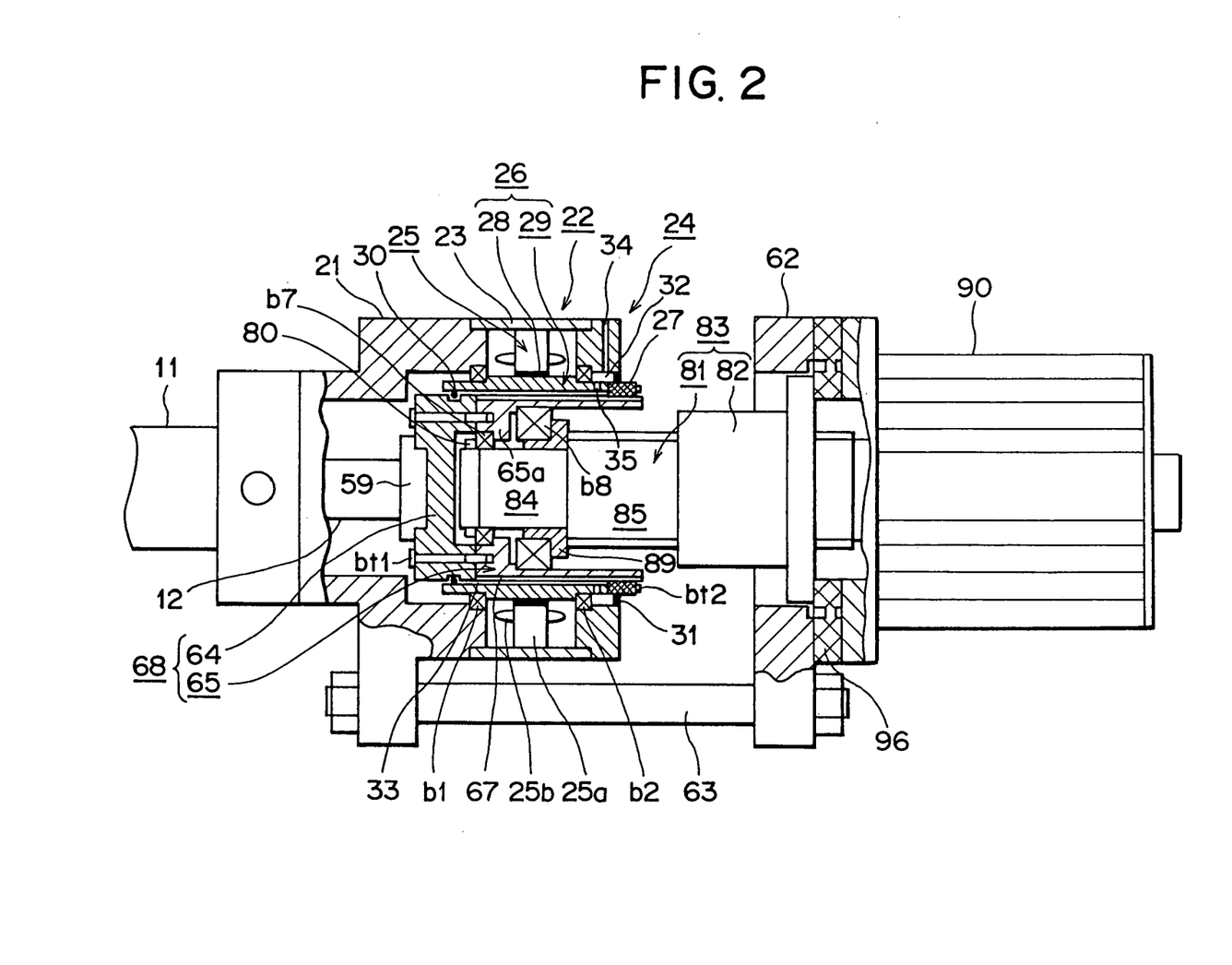
FIG. 2 is a conceptual view of an injection apparatus according to a first embodiment of the present invention.

FIG. 2 conceptually shows an injection apparatus according to a first embodiment of the present invention.

In FIG. 2, reference numeral 11 denotes a heating cylinder, which serves as a cylinder member; reference numeral 12 denotes a screw, which serves as an injection member, disposed within the heating cylinder 11 such that it can rotate and can advance and retreat (move leftward and rightward in FIG. 2); an unillustrated injection nozzle is attached to the front end (left-hand end in FIG. 2) of the heating cylinder 11; and a nozzle hole is formed in the injection nozzle.

The screw 12 includes a screw body and an unillustrated screw head attached to the front end of the screw body. An unillustrated flight is spirally formed on the outer circumferential surface of the screw body, thereby forming a spiral groove.

The rear end (right-hand end in FIG. 1) of the heating cylinder 11 is attached to a front injection support 21, which serves as a front support member. A rear injection support 62, which serves as a rear support member, is disposed a predetermined distance away from the front injection support 21. Rods 63 extend between the front injection support 21 and the rear injection support 62, for maintaining a predetermined distance therebetween. The front injection support 21, the rear injection support 62, and the rods 63 constitute an injection frame.

A circular connection member 64 is integrally attached to the rear end of the screw 12 via a coupler 59. A cylindrical support member 65 is attached to the connection member 64 by use of bolts bt1. The connection member 64 and the support member 65 constitute a rotary slide member 68, which unitarily rotates with the screw 12. The support member 65 has an axial length equivalent to the stroke of the screw 12 and has a male spline 67 formed on the outer circumferential surface thereof.

In order to transmit rotation to the rotary slide member 68, an electrically operated metering motor 22, which serves as a first drive section and a rotation restraint section, is disposed adjacently to the rear end of the front injection support 21 to thereby be integrated with the front injection support 21 and in such a manner as to surround the rotary slide member 68. The metering motor 22 is in the first drive mode in a metering process and in the second drive mode in an injection mode. The metering motor 22 in the first drive mode rotates the rotary slide member 68, whereas the metering motor 22 in the second drive mode restrains rotation of the rotary slide member 68.

The metering motor 22 includes a sleeve 23 fixedly attached to the front injection support 21; a rear annular member 24 attached to the rear end of the sleeve 23; a stator 25, which is attached to the front injection support 21 via the sleeve 23; and a cylindrical rotor 26 disposed radially inward of the stator 25. A spline nut 27 is attached to the rear end of the rotor 26 by use of bolts bt2. The stator 25 includes a core 25a attached to the sleeve 23, and a coil 25b wound onto the core 25a. The rotor 26 includes a hollow, cylindrical member 29, which is disposed coaxially with the rotary slide member 68 and radially outward of the rotary slide member 68 such that it can move relative to the rotary slide member 68; and a permanent magnet 28, which serves as a flat magnet, attached to the outer circumferential surface of the cylindrical member 29 at a position corresponding to the stator 25. The cylindrical member 29 functions as an output shaft of the metering motor 22 and is supported rotatably relative to the front injection support 21 and the rear annular member 24 by means of a bearing b1 and a bearing b2, respectively.

In this case, the sleeve 23 and the rear annular member 24 constitute a casing, which is integrally formed with the front injection support 21. In this manner, the front injection support 21 and the metering motor 22 can be integrally formed, thereby reducing the size of the injection apparatus.

While allowing the rotary slide member 68 to axially move relative to the spline nut 27, the spline nut 27 transmits to the rotary slide member 68 rotation generated by the metering motor 22 in the first drive mode and transmits to the rotary slide member 68 the force of restraint generated by the metering motor 22 in the second drive mode, to thereby restrain the rotation of the rotary slide member 68. For such operation, the rotary slide member 68 is disposed in such a manner as to be nonrotatable relative to the spline nut 27 and axially movable relative to the rotor 26. The outer circumferential surface of the connection member 64 and the inner circumferential surface of the rotor 26 are in slidable contact with each other. That is, at the front end of the cylindrical member 29, the inner circumferential surface of the cylindrical member 29 and the outer circumferential surface of the connection member 64 are slidable relative to each other, with a seal 30, which serves as a first sealing device, being interposed therebetween. At the rear end of the support member 65, the male spline 67 and a female spline formed on the inner circumferential surface of the spline nut 27 are slidably engaged.

In this case, the axial dimension of the spline nut 27 can be made small, and the axial dimension of the male spline 67 can be made large.

Therefore, when sliding motion occurs between the female spline of the spline nut 27 and the male spline 67, load acts on the inner circumferential surface of the spline nut 27 at all times, so that the inner circumferential surface of the female spline of the spline nut 27 wears quicker than does the outer circumferential surface of the male spline 67. However, since the spline nut 27 is attached to the end portion of the metering motor 22; i.e., to the rear end of the cylindrical member 29, by use of the bolts bt2, work for checking the progress of wear and exchanging the spline nut 27 can be simplified.

Moreover, if a spline were formed on the inner circumferential surface of the cylindrical member 29, the thickness of the cylindrical member 29 would have to be increased accordingly. By contrast, in the present embodiment, since the spline nut 27 is attached to the rear end of the cylindrical member 29, the radial dimension of the cylindrical member 29 can be decreased. Accordingly, it is possible to prevent the diameter of the rotor 26 from increasing excessively and to reduce the radial dimension of the metering motor 22. As a result, the rods 63 can be disposed inside, whereby the size of the injection apparatus can be reduced.

Further, at the time of assembly, maintenance, etc. of the injection apparatus, the ball screw 83 is built into the injection apparatus along with the support member 65 and the bearings b7 and b8. Such building-in work must be performed as follows. First, in a state in which the spline nut 27 is removed, the ball screw 83, the support member 65, and the bearings b7 and b8 are built into the injection apparatus. After that, the female spline formed on the inner circumferential surface of the spline nut 27 is brought into meshing engagement with the male spline 67. Subsequently, the spline nut 27 is attached to the rear end of the cylindrical member 29 by use of the bolts bt2.

In this case, a worker can build the ball screw 83 and the support member 65 into the injection apparatus without considering the meshing engagement between the female spline and the male spline 67. Therefore, the time required for the building-in work can be shortened, and easiness of assembly, maintenance, etc. can be enhanced. Note that the female spline and the male spline 67 constitute a rotation transmission section; and the female spline constitutes a first transmission element; and the male spline 67 constitutes a second transmission element.

When the rotor 26 is rotated through operation of the metering motor 22 in the first drive mode, rotation is transmitted to the rotary slide member 68 via the spline nut 27, whereby the rotary slide member 68 is rotated in the regular direction or in reverse as needed, and thus the screw 12 is rotated accordingly. When the rotor 26 is stopped by the force of restraint generated through the metering motor 22 being brought into the second drive mode, rotation of the rotary slide member 68 is restrained, so that the rotation of screw 12 is also restrained.

The rear end of the inner circumferential surface of the rear annular member 24 and the outer circumferential surface of the spline nut 27 are in slidable contact with each other via a seal 31, which serves as a second sealing device. The rear annular member 24, the cylindrical body 29, the bearing b2, and the seal 31 define a first lubricant chamber 32. The first lubricant chamber 32 is filled with, for example, grease, which serves as a lubricant. The cylindrical member 29, the rotary slide member 68, the spline nut 27, and the seal 30 define a second lubricant chamber 33. The second lubricant chamber 33 is filled with, for example, grease. A first lubricant supply path 34 is formed in the rear annular member 24 so as to communicate an unillustrated lubricant source and the first lubricant chamber 32. A second lubricant supply path 35 is formed in the cylindrical member 29 so as to communicate the first lubricant chamber 32 and the second lubricant chamber 33.

In this case, when a sliding motion occurs between the female spline formed on the inner circumferential surface of the spline nut 27 and the male spline 67, the seal 30 slides against the smooth inner circumferential surface of the cylindrical member 29. Therefore, since the second lubricant chamber 33 can be sealed securely, leakage of grease to the side toward the screw 12 can be prevented. Moreover, the seal 30 is disposed at one end portion; i.e., the front end, of the cylindrical member 29, and the spline nut 27 is disposed at the rear end of the cylindrical member 29. Therefore, the capacity of the second lubricant chamber 33 can be increased, and a sufficient quantity of grease can be accommodated within the second lubricant chamber 33. Therefore, grease can be supplied reliably between the female spline on the inner circumferential surface of the spline nut 27 and the male spline 67.

Further, the first lubricant chamber 32 can be formed by the contact of the seal 31 and the cylindrical member 29 in such a manner that the length of the cylindrical member 29 is axially increased. In this case, the concentricity between the seal 31 and the cylindrical member 29 will be ameliorated. Thus, the first lubricant chamber 32 can be sealed firmly.

A ball screw 83 is disposed rearward (rightward in FIG. 2) of the front injection support 21 and serves as a direction-of-motion changing section. The ball screw 83 includes a ball screw shaft 81, which serves as a first conversion element of the direction-of-motion changing section, and a ball nut 82, which serves as a second conversion element of the direction-of-motion changing section. The ball screw shaft 81 and the ball nut 82 are screw-engaged with each other. The ball screw shaft 81 includes a small-diameter shaft portion 84, a large-diameter threaded portion 85, and an unillustrated connection portion for connection with the injection motor 90 serving as a second drive section, which are sequentially formed from the front end of the ball screw shaft toward its rear end. An annular flange member 89 is externally fitted to the shoulder between the shaft portion 84 and the threaded portion 85.

Incidentally, rotation generated upon drive of the injection motor 90 is transmitted to the ball screw shaft 81. The ball screw 83 converts the rotary motion transmitted to the ball screw shaft 81 to a rotary, rectilinear motion, to thereby rotate and reciprocate the ball screw shaft 81.

For such operation, the ball screw shaft 81 is supported, at its front end by bearings b7 and b8, in such a manner as to be rotatable and axially immovable relative to the rotary slide member 68, and is rotatably engaged with and supported by the ball nut 82 at its center. That is, the rotary slide member 68 is disposed in such a manner as to be rotatable and axially immovable relative to the ball screw 83. An unillustrated male screw is formed on a front end part of the shaft portion 84, and a bearing nut 80 is disposed while being engaged with the male screw. The bearing nut 80, together with a protrusion 65a formed on the inner circumferential surface of the support member 65, positions the bearing b7.

The ball nut 82 is fixedly attached to the rear injection support 62 via the load cell 96. The load cell 96 serves as an injection force detector for detecting an injection force and as a dwell pressure detector for detecting a dwell pressure.

Accordingly, when rotation generated through operation of the injection motor 90 in the regular or reverse direction is transmitted to the ball screw shaft 81 via the connection portion, the ball screw shaft 81 is caused to advance or retreat while rotating, since the threaded portion 85 and the ball nut 82 are engaged with each other.

The motion of the ball screw shaft 81 consists of a rectilinear motion component for causing the ball screw shaft 81 to advance or retreat and a rotary motion component for rotating the ball screw shaft 81. The rectilinear motion component and the rotary motion component are transmitted to the rotary slide member 68 via the bearings b7 and b8.

In the injection process or a like process, in which the rotary slide member 68 is caused to advance or retreat without rotation, the metering motor 22 is brought into the second drive mode; i.e., the rotation restraint mode, and the injection motor 90 is brought into the drive mode, whereby rotation of the rotary slide member 68 is restrained, and thus the rotary slide member 68 can be axially moved without rotation. As a result, a rectilinear motion is transmitted to the screw 12, which is integrally attached to the rotary slide member 68, whereby the screw 12 is caused to advance (move leftward in FIG. 2).

Next, the operation of the thus-configured injection apparatus will be described.

First, in the metering process, the metering processing means of an unillustrated controller performs metering processing, whereby the metering motor 22 is brought into the first drive mode and is caused to operate in the mode. At this time, rotation generated on the rotor 26 is transmitted to the screw 12 via the spline nut 27 and the rotary slide member 68, to thereby rotate the screw 12 in the regular direction.

This rotation of the screw 12 causes unillustrated resin, which drops from an unillustrated hopper disposed on the heating cylinder 11, to advance along the aforementioned groove formed on the outer circumferential surface of the screw 12, and causes the screw 12 to retreat (move rightward in FIG. 2), whereby the resin is stored in a space located ahead of the screw head. At this time, the force of retreat induced on the screw 12 causes the rotary slide member 68 to retreat relative to the spline nut 27. As the rotary slide member 68 retreats, the ball screw shaft 81 is caused to retreat while rotating.

In the injection process, the injection processing means of the controller performs injection processing, to thereby cause the injection motor 90 to operate. At this time, the rotation generated by the injection motor 90 is transmitted to the ball screw shaft 81 via the sleeve 95 and the spline portion 87. The ball screw 83 converts the rotary motion to a rotary, rectilinear motion. As a result, the ball screw shaft 81 is caused to advance while rotating. Also, the injection processing means causes the metering motor 22 to operate in the rotation restraint mode, to thereby control the rotational speed of the rotor 26 to 0 (rpm) for generation of the force of restraint. The force of restraint is transmitted to the rotary slide member 68 via the spline nut 27, to thereby restrain rotation of the rotary slide member 68, which rotation would otherwise be caused by a rotational force transmitted to the rotary slide member 68 via the ball screw shaft 81. As a result, the screw 12, which is integrally attached to the rotary slide member 68, is caused to advance without rotation.

When the screw 12 is caused to advance as described above, the resin, which is stored in the space located ahead of the screw head, is injected from an injection nozzle into the cavity of an unillustrated mold apparatus so as to fill the cavity. In order to prevent backflow of the resin stored in the space located ahead of the screw head, an unillustrated anti-backflow device is disposed around the screw head.

As described above, the rotor 26 includes the cylindrical member 29 and the permanent magnet 28, and rotation generated through operation of the metering motor 22 can be transmitted directly to the rotary slide member 68, thereby eliminating the need for a transmission mechanism, which is composed of an output gear, a counter drive gear, a counter driven gear, a rotary member, etc. Thus, the number of components can be reduced, and the cost of the injection apparatus can be reduced. Further, since a space for disposition of the metering motor 22 can be reduced, the injection apparatus can be reduced in size accordingly.

Use of the permanent magnet 28 as a component of the rotor 26 eliminates the need to dispose a coil, whereby the diameter of the cylindrical member 29 can be increased accordingly. Thus, since the diameter of the ball screw shaft 81 can be increased, a ball screw 83 having a large rated capacity can be used, and heavy load molding can be performed. As a result, the injection motor 90 can be reduced in size, and can be operated under heavy load molding conditions.

In the thus-configured injection apparatus, the hollow cylindrical member 29 is disposed in the rotor 26, the cylindrical member 29 and the rotary slide member 68 are connected to each other, and thus rotation generated through operation of the metering motor 22 is transmitted directly to the rotary slide member 68. However, in this case, since the rotary slide member 68 and the ball screw shaft 81 are disposed in such a manner as to extend through the cylindrical member 29, an encoder for detecting the rotational speed of the metering motor 22 cannot be attached to the cylindrical member 29. Next will be described a second embodiment of the present invention capable of detecting the rotational speed of the metering motor 22 without use of an encoder. Structural features similar to those of the first embodiment are denoted by common reference numerals, and repeated description thereof is omitted.

Figure 3:
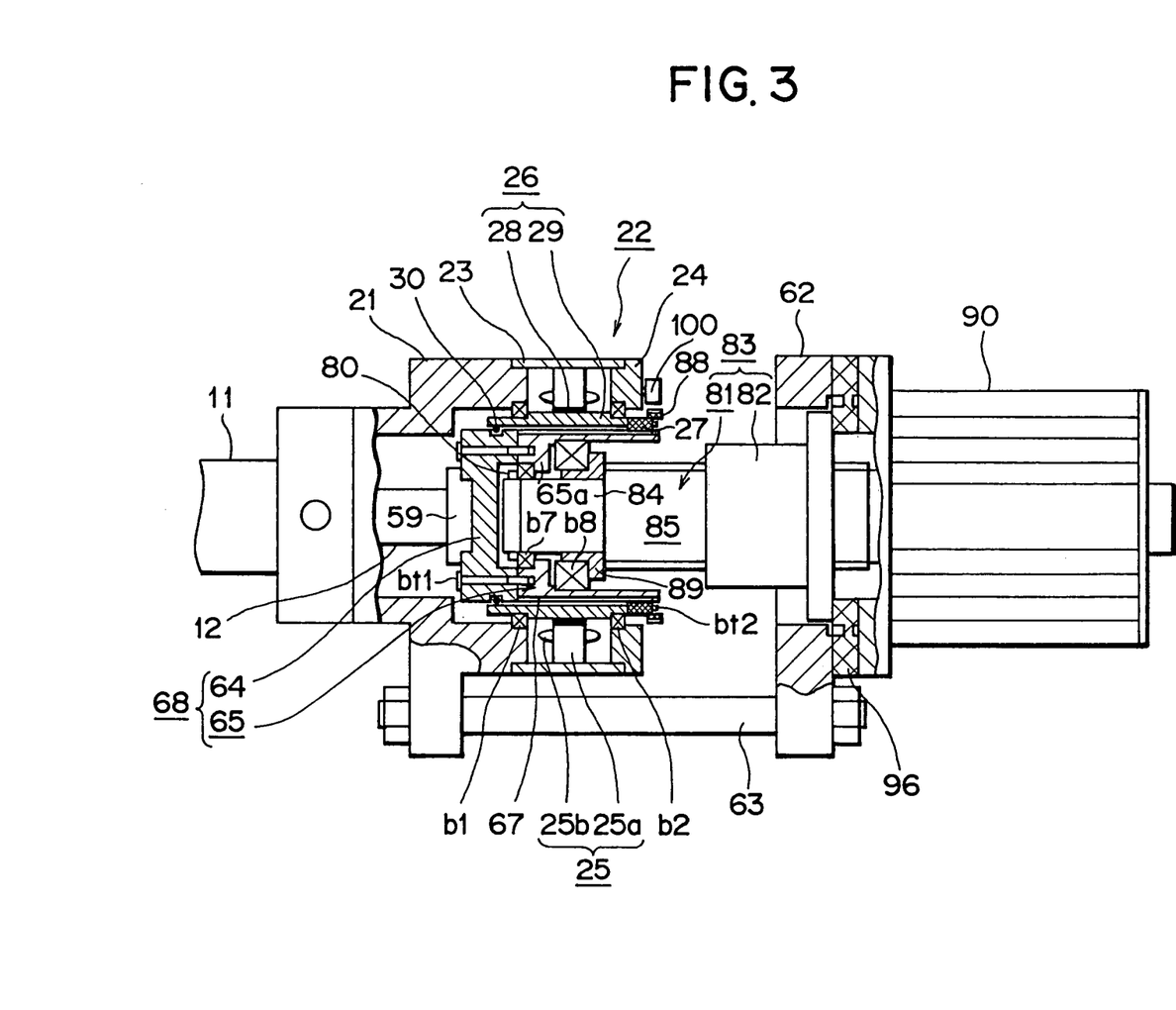
FIG. 3 is a conceptual view of an injection apparatus according to a second embodiment of the present invention.
Figure 4:
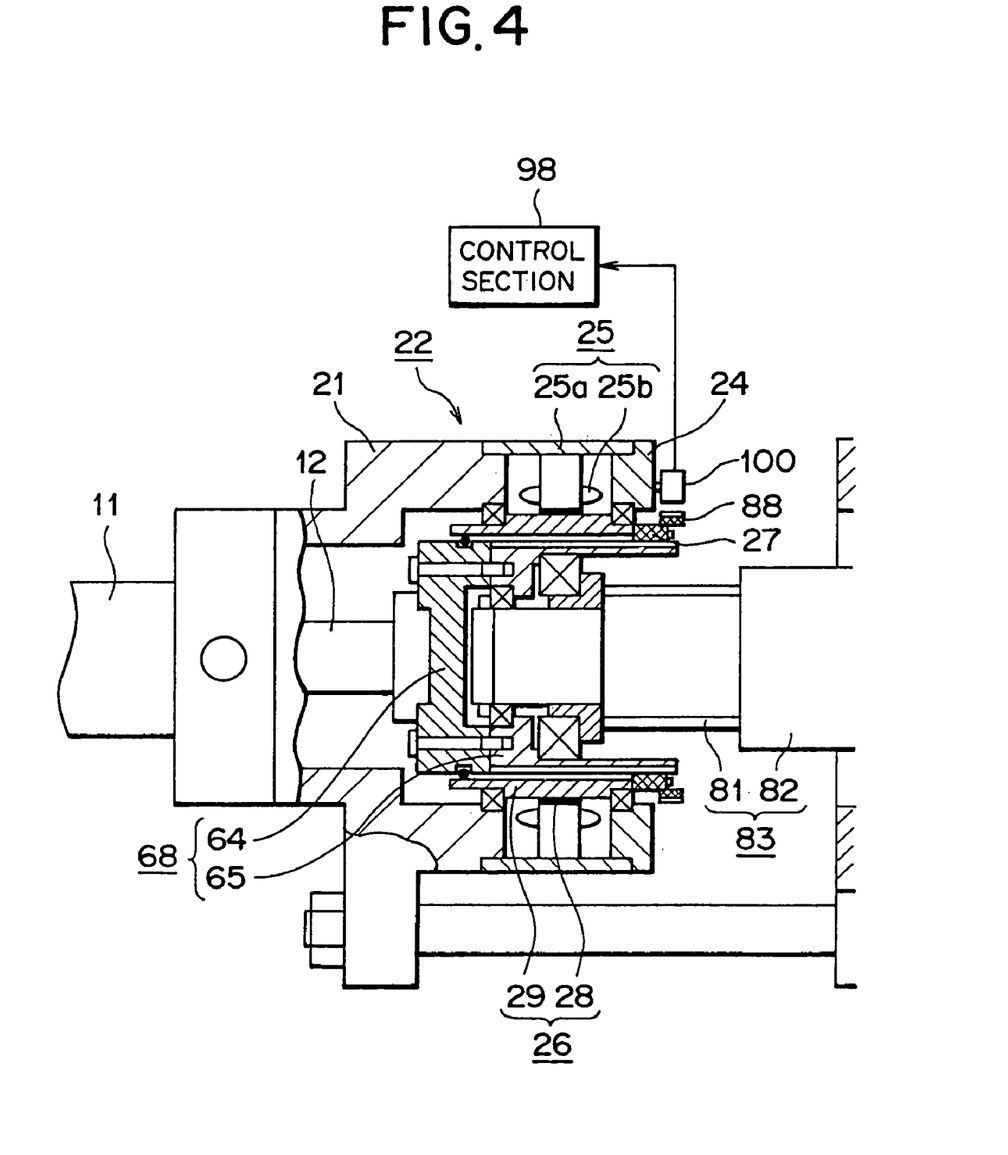
FIG. 4 is a conceptual view of a rotational-speed detector in the second embodiment.
Figure 5:
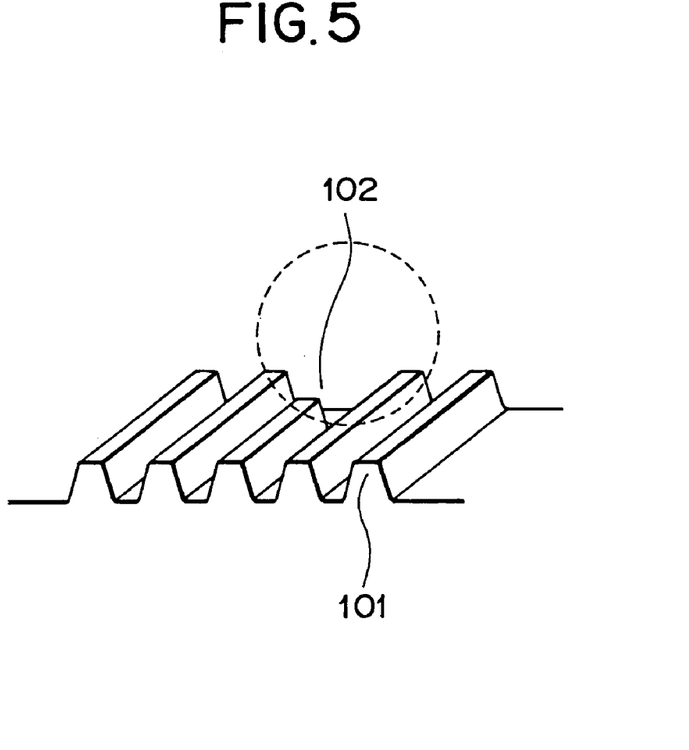
FIG. 5 is a perspective view showing an essential portion of a gear section in the second embodiment.
Figure 6:
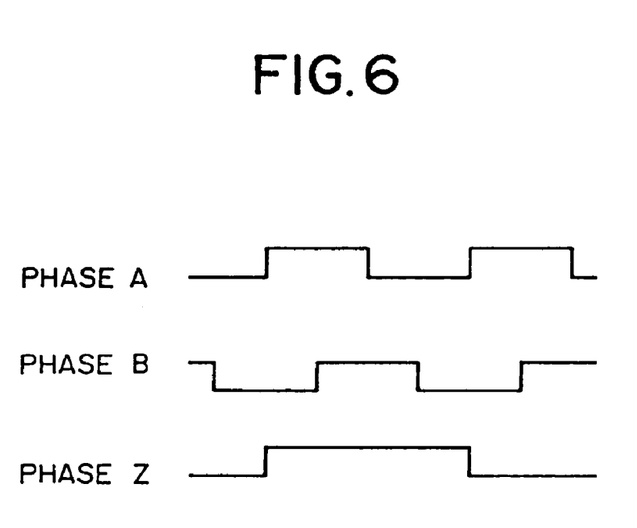
FIG. 6 is a diagram showing an output from a detecting element in the second embodiment.

FIG. 3 conceptually shows an injection apparatus according to the second embodiment of the present invention; FIG. 4 conceptually shows a rotational-speed detector in the second embodiment; FIG. 5 perspectively shows an essential portion of a gear section in the second embodiment; and FIG. 6 shows an output from a detecting element in the second embodiment.

In this case, in order to detect the rotational speed of the metering motor 22, which serves as the first drive section, in a noncontacting manner, an annular gear 88, which serves as an element to be detected, is attached to the rear end (right-hand end in FIGS. 3 and 4) of the cylindrical member 29 of the rotor 26 via the spline nut 27, and an output sensor 100, which serves as a detecting element, is attached to the rear annular member 24 at a predetermined circumferential position in such a manner as to face the gear 88. The gear 88 and the output sensor 100 constitute a rotational-speed detector.

The gear 88 is made of a metal. For example, as shown in FIG. 5, a plurality of teeth 101; in the present embodiment, 256 teeth 101, are, formed on the detection surface of the gear 88 at predetermined pitches, and a cutout 102 is formed on a predetermined tooth 101. That is, the teeth 101 and the cutouts 102 form projections and recesses on the detection surface of the gear 88. The output sensor 100 includes a magnet. As the gear 88 is rotated through rotation of the rotor 26, the distance between the surface of the gear 88 and the output sensor 100 varies according to recesses and projections of the gear 88, thereby causing magnetic lines of force generated by the output sensor 100 to be distorted through electromagnetic induction. The distortion of magnetic lines of force is converted to an electric signal, thereby generating a detection signal composed of a phase A sensor output, a phase B sensor output, and a phase Z sensor output as shown in FIG. 6. The detection signal is sent to a controller 98. The phase A and phase B sensor outputs are generated by the teeth 101, and the phase Z sensor output is generated by the cutout 102. The phase A and phase B sensor outputs assume a pattern such that a high level and a low level are alternated at predetermined pitches, whereas the phase Z sensor output assumes a pattern such that a high level continues as long as two pitches at a predetermined timing.

Upon reception of the detection signal from the output sensor 100, the controller 98 reads edges of the sensor outputs and detects, on the basis of read edges, the rotational speed of the metering motor 22 and the position (absolute position) of a certain pole of the rotor 26 on the permanent magnet 28.

According to the present embodiment, the annular gear 88 is used as an element to be detected and is attached to the spline nut 27. However, the gear 88 may be replaced with a metallic tape whose surface has recesses and projections formed thereon by etching. The tape is affixed onto the outer circumferential surface of the spline nut 27. Also, in this case, recesses and projections on the tape surface cause magnetic lines of force generated by the output sensor 100 to be distorted through electromagnetic induction. The distortion of magnetic lines of force is converted to an electric signal, thereby generating a detection signal composed of a phase A sensor output, a phase B sensor output, and a phase Z sensor output.

According to another alternative method, a magnetized coating layer, which serves as an element to be detected, is formed on the outer circumferential surface of the spline nut 27. Magnetic lines of force, which vary with rotation of the spline nut 27, are read by the output sensor 100, which serves as a detecting element.

According to further alternative method, a laser beam emitter and a laser beam receiver, which serve as a detecting element, are disposed on the rear annular member 24 at the respectively predetermined positions, and a reflector and a slit, which serve as an element to be detected, are disposed on the spline nut 27, thereby configuring a rotational-speed detector. In this case, a laser beam emitted from the laser beam emitter is reflected by the reflector, and the reflected beam generates a diffractive interference pattern in the course of passing through the slit. The laser beam receiver reads the diffractive interference pattern to thereby generate a detection signal.

Next, the operation of the thus-configured injection apparatus will be described.

First, in the metering process, an unillustrated metering processing means of the controller 98 performs metering processing, whereby the metering motor 22 is brought into the first drive mode and is caused to operate in the mode. At this time, rotation generated on the rotor 26 is transmitted to the screw 12 via the spline nut 27 and the rotary slide member 68, to thereby rotate the screw 12 in the regular direction. In this case, a detection signal generated by the output sensor 100 is sent to the controller 98. On the basis of the detection signal, the controller 98 detects the rotational speed of the metering motor 22 and performs feedback control.

This rotation of the screw 12 causes unillustrated resin, which drops from an unillustrated hopper disposed on the heating cylinder 11, to advance along the groove formed on the outer circumferential surface of the screw 12, and causes the screw 12 to retreat (move rightward in FIGS. 3 and 4), whereby the resin is stored in a space located ahead of the screw head. At this time, the force of retreat induced on the screw 12 causes the rotary slide member 68 to retreat relative to the cylindrical member 29. As the rotary slide member 68 retreats, the ball screw shaft 81, which serves as the first conversion element, is caused to retreat while rotating.

In the injection process, an unillustrated injection processing means of the controller 98 performs injection processing, to thereby cause the injection motor 90 to operate. At this time, the rotation generated by the injection motor 90 is transmitted to the ball screw shaft 81 via the connection portion. The ball screw 83, which serves as the direction-of-motion changing section, converts the rotary motion to a rotary, rectilinear motion. As a result, the ball screw shaft 81 is caused to advance (move leftward in FIGS. 3 and 4) while rotating. Also, the injection processing means causes the metering motor 22 to operate in the rotation restraint mode, to thereby control the rotational speed of the rotor 26 to 0 (rpm) for generation of the force of restraint. The force of restraint is transmitted to the rotary slide member 68 via the spline nut 27, to thereby restrain rotation of the rotary slide member 68, which rotation would otherwise be caused by a rotational force transmitted to the rotary slide member 68 via the ball screw shaft 81. As a result, the screw 12, which is integrally attached to the rotary slide member 68, is caused to advance without rotation.

In this case, the load cell 96, which serves as the injection force detector and as the dwell pressure detector, detects an injection force and sends a detection signal to the controller 98. On the basis of the detection signal, the controller controls the changeover between filling and dwelling. As mentioned previously, on the basis of a detection signal from the output sensor 100, the controller 98 performs feedback control.

When the screw 12 is caused to advance as described above, the resin, which is stored in the space located ahead of the screw head, is injected from an injection nozzle into the cavity of an unillustrated mold apparatus so as to fill the cavity. In order to prevent backflow of the resin stored in the space located ahead of the screw head, an unillustrated anti-backflow device is disposed around the screw head.

As described above, the gear 88 is attached to the rear end of the cylindrical member 29 via the spline nut 27, and the output sensor 100 is disposed in opposition to the gear 88. Thus, even though the metering motor 22 employs the hollow rotor 26, the rotational speed of the metering motor 22 can be detected. Therefore, metering can be performed smoothly.

Since the permanent magnet 28 can be used as a component of the rotor 26, there is no need for disposing a coil. Therefore, the injection apparatus can be reduced in size.

Since the need to dispose a coil is eliminated, the diameter of the cylindrical member 29 can be increased accordingly. Thus, a ball screw 83 having a large rated capacity can be incorporated, and heavy load molding can be performed. As a result, the injection motor can be reduced in size, and can be operated under heavy load molding conditions.

Since the detector of, for example, a magnetic type or a laser slit type is a non-contacting type, stable rotation can be generated even when the metering motor 22 is driven at high speed.

Further, the arrangement of the metering motor 22 and the injection motor 90 can be changed in such a manner that the injection motor 90 is attached to the injection support 21. In this case, a male spline is formed on the outer periphery of the ball screw shaft 81, serving as a first conversion element, or the ball screw nut 82, serving as a second conversion element; and via the male spline and a female spline of the spline nut 27, which is attached to the side face of the rotor 26 and serves as a rotation transmission section, rotation of the rotor 26 is transmitted to the ball screw shaft 81 to thereby reciprocate the screw 12. In this case as well, the permanent magnet 28 is provided on the outer circumferential surface of the cylindrical member 29, which constitutes the rotor 26; and rotation generated upon drive of the injection motor 90 can be transmitted directly to the ball screw 83, which serves as a direction-of-motion changing means. Therefore, a transmission mechanism which consists of as an output gear, a counter drive gear, a counter driven gear, etc. and which transmits rotation of the injection motor becomes unnecessary; and generation of noise due to meshing engagement of gears and other components can be prevented. Accordingly, the number of components can be reduced, generation of torque loss can be prevented, and cost of the injection apparatus can be reduced. Further, since a space for disposition of the first drive section can be reduced, the injection apparatus can be reduced in size accordingly.

Moreover, even when the arrangement of the metering motor 22 and the injection motor 90 is changed in such a manner that the injection motor 90 is attached to the injection support 21, rotational speed of the injection motor 90 can be detected by use of gears, an output sensor, etc., as in the second embodiment.

The present invention is not limited to the above-described embodiments. Numerous modifications and variations of the present invention are possible in light of the spirit of the present invention, and they are not excluded from the scope of the present invention.

What is claimed is:

1. A control method of a rotational speed of a screw for an injection molding machine, wherein rotation of a motor is transmitted to the screw disposed within a cylinder member attached to an injection frame, comprising the steps of:
   (a) sending an electric current to a stator attached to the injection frame;
   (b) rotating a rotor which is disposed radially inward of the stator, the screw, and an element to be detected having a first pitch and a second pitch;
   (c) detecting a rotational speed of the screw by detecting the first pitch by a detecting element disposed in opposition to the element to be detected and in a manner where the detecting element does not come in contact with the element to be detected; and
   (d) detecting an absolute position of a first magnet attached to the rotor by detecting the second pitch different from the first pitch by the detecting element.

2. The control method of a rotational speed of a screw for an injection molding machine, as claimed in claim 1, wherein the rotation of the rotor is transmitted to the screw via a rotary slide member, so that the screw is rotated, and a resin entered to the injection molding machine is moved into and melted in the cylinder member.

3. The control method of a rotational speed of a screw for an injection molding machine, as claimed in claim 2, further comprising the step of:
   (d) rotating so that the rotary slide member retreats.

4. The control method of a rotational speed of a screw for an injection molding machine, as claimed in claim 2, further comprising the step of:
   (e) generating a force of restraint to the rotor after the resin is melted, so that the screw is caused to advance in a state where the screw is not rotated.

5. The control method of a rotational speed of a screw for an injection molding machine, as claimed in claim 1, further comprising the step of:
   (f) rotating the element to be detected upon the rotation of the rotor, and detecting a rotational speed of the rotor by the detecting element disposed in opposition to the element to be detected, and thereby a feedback control is performed.

6. The control method of a rotational speed of a screw for an injection molding machine, as claimed in claim 5, wherein the detecting element includes a second magnet, and converts distortion of magnetic lines of force generated by rotating recess and projection configurations formed at the element to be detected to an electric signal.

7. The control method of a rotational speed of a screw for an injection molding machine, as claimed in claim 1, wherein a ball screw is disposed radially inward of the rotor, and the hollow and cylindrical member is disposed radially outward of the ball screw.

8. The control method of a rotational speed of a screw for an injection molding machine, as claimed in claim 2, wherein the rotary slide member is disposed radially inward of the rotor, and the hollow and cylindrical member is disposed radially outward of the rotary slide member.

9. The control method of a rotational speed of a screw for an injection molding machine, as claimed in claim 1, wherein the rotor includes a hollow and cylindrical member, and wherein the first magnet is attached to the hollow and cylindrical member.

10. A molding method using an injection molding machine wherein rotation of a motor is transmitted the screw disposed within a cylinder member attached to an injection frame, the molding method comprising the steps of:
   (a) sending an electric current to a stator attached to the injection frame;
   (b) rotating a rotor that is disposed radially inward of the stator, the screw, and an element to be detected having a first pitch and a second pitch;
   (c) detecting a rotational speed of the screw by detecting the first pitch by a detecting element disposed in opposition to the element to be detected and in a manner where the detecting element does not come in contact with the element to be detected;
   (d) detecting an absolute position of a magnet attached to the rotor by detecting the second pitch different from the first pitch by the detecting element;
   (e) controlling rotation of the screw based on a detected value detected by the detecting element so that resin supplied by the screw is molten; and
   (f) driving an injection motor after the resin is molten so that the screw is advanced and the resin is supplied into a cavity forming part of a molding machine.

* * * * *